April 4, 1961
H. L. DREYER
2,978,561
DIGITAL CONVERTER
Filed Dec. 16, 1957
2 Sheets-Sheet 1
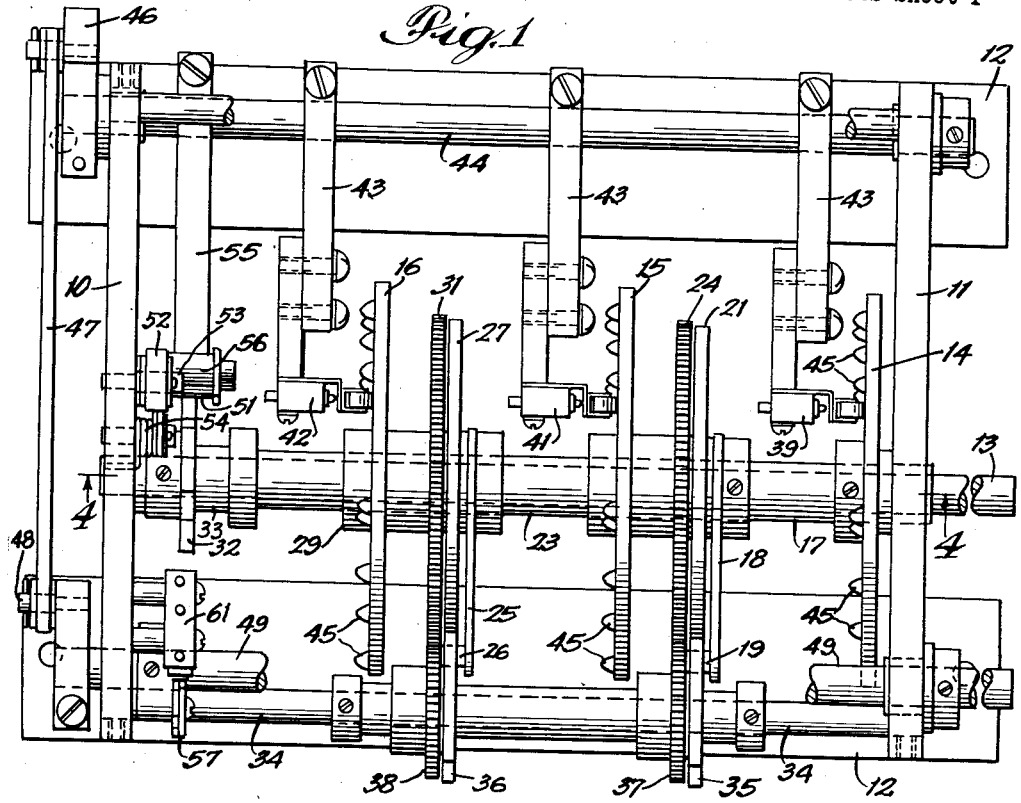
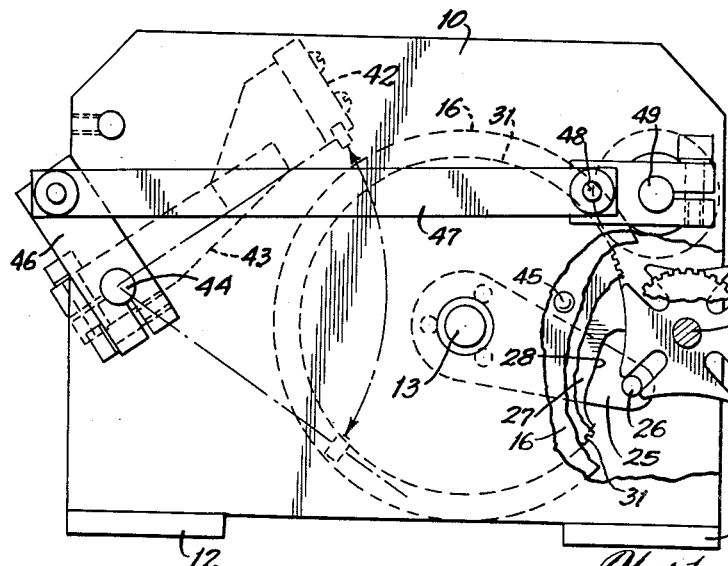
INVENTOR:
Herbert L. Dreyer,
BY Bair Freeman & Molinare
ATTORNEYS.

April 4, 1961 H. L. DREYER 2,978,561
DIGITAL CONVERTER
Filed Dec. 16, 1957 2 Sheets-Sheet 2
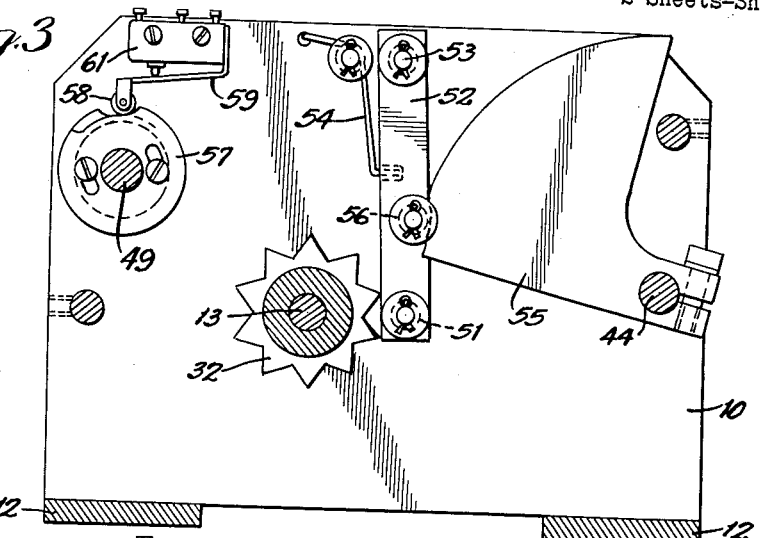
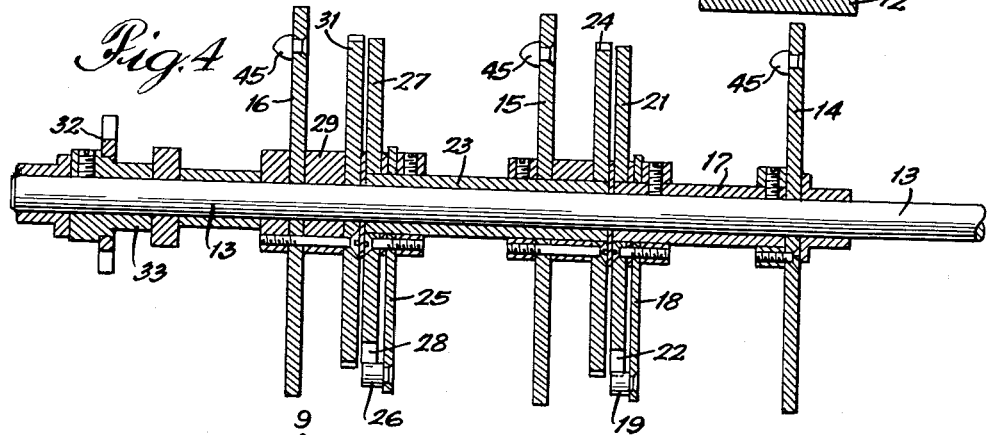
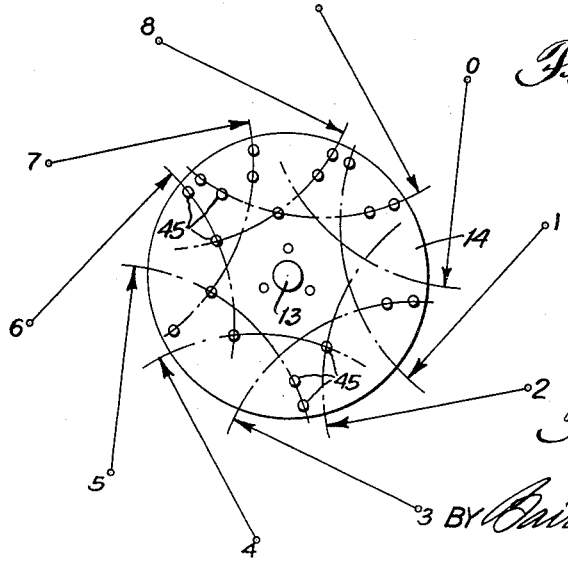
INVENTOR:
Herbert L. Dreyer,
BY Blair, Freeman & Molinare
ATTORNEYS.

United States Patent Office 2,978,561
Patented Apr. 4, 1961

2,978,561

DIGITAL CONVERTER

Herbert L. Dreyer, Grayslake, Ill., assignor to Streeter-Amet Company, Grayslake, Ill., a corporation of Illinois Filed Dec. 16, 1957, Ser. No. 702,981

10 Claims. (Cl. 200—153)

This invention relates to digital converters and, more particularly, to apparatus for converting a movement or position produced by a sensing device such as a scale to readable or recordable digits.

Heretofore, various mechanisms, such as step-cam devices, have been used to convert movements or positions representative of values such as weight to digital form. These mechanisms, in general, have been expensive to build, requiring a high degree of accuracy in manufacture, and are relatively complex in operation.

It is one of the objects of the present invention to provide a digital converter which is simple and relatively inexpensive to build and operate, and which does not require a high degree of accuracy in its construction.

Another object is to provide a digital converter in which pulses are produced by moving an indicating device over the face of a disc in different paths corresponding to different values and providing actuating elements on the disc, spaced so that different numbers of elements are engaged by the indicating device in different paths to produce a different number of pulses. Preferably, the indicating device is an electric switch and the actuating elements are cam projections to engage and operate the switch.

According to a feature of the invention, the indicating device oscillates between a rest position beyond the periphery of the disc to a limit position within the periphery of the disc and certain of the actuating elements are positioned to be engaged by the indicating device at the limit position to produce odd numbers of pulses.

A further object is to provide a digital converter in which the disc is latched in position during the movement of the indicating device thereover. In the preferred construction a cam operated simultaneously with movement of the indicating device causes a keeper to engage a star wheel secured to the disc accurately to position the disc and to latch it against movement.

A still further object is to provide a digital converter in which a plurality of discs are derivably connected, to be driven one from the other in steps corresponding to units, tens, etc., and are simultaneously traversed by indicating devices to produce pulses corresponding to the digits in the value represented by the positions of the disc.

The above and other objects and features of the invention will be more readily apparent from the following description when read in connection with the accompanying drawings in which Figure 1 is a side elevation of a digital converter embodying the invention with parts broken away;

Figure 2 is an end elevation with parts broken away;

Figure 3 is a partial transverse section;

Figure 4 is a section through the disc-supporting shaft on the line 4—4 of Figure 1; and Figure 5 is a diagrammatic face view of a disc.

The apparatus, as shown, comprises a main framework, including end plates 10 and 11 supported by base strips 12. The frame carries all operating parts of the mechanism and may be enclosed in a suitable housing or cover, not shown, for normal operation.

The end plates 10 and 11 rotatably support a main shaft 13, which projects beyond one end of the frame for connection to a suitable input mechanism. For use with a scale, the shaft could be connected directly to the scale beam to be turned to a position corresponding to the weight on the scale, or could be driven by a servomotor to a position corresponding to the weight or other value to be converted to digital form. As best seen in Figure 4, the shaft 13 carries a series of discs, 14, 15 and 16, corresponding to units, tens and hundreds in the value. It will be understood that more or less discs than the three illustrated could be employed, depending upon the magnitude of the values to be indicated.

The disc 14 is rigidly secured to the shaft 13 through a sleeve 17, so that the disc 14, which corresponds to units in the value, will be turned directly by the shaft to a position corresponding to the lowest integer or unit in the value. The sleeve 17 carries an arm 18 having a pin 19 adjacent its free end, and also carries a disc 21 having a gap or recess 22 at one point in its periphery.

The disc 15 is carried by a sleeve 23, which is rotatable on the shaft 13. A gear 24 is secured to the sleeve 23 and lies closely adjacent to the disc 21. At its opposite end the sleeve 23 carries an arm 25 having a pin 26 at its free end, and a disc 27 formed with a gap 28 at one point in its periphery in registry with the pin 26.

The disc 16 is carried by a sleeve 29 which is rotatable on the shaft 13, and which also carries a gear 31. In addition to the parts described above, the shaft 13 rigidly carries a star wheel 32, which is secured thereto through a sleeve 33 for a purpose to appear more fully hereinafter.

In operation of the apparatus the disc 15 is driven by the disc 14 and the disc 16 is driven, in turn, by the disc 15. For normal digital indication the disc 15 is driven through a step equal to one-tenth of a revolution for each complete revolution of the disc 14, and the disc 16 is driven through a step equal to one-tenth of a revolution for each complete revolution of the disc 15. For this purpose a Genera drive mechanism is provided, as best shown in Figures 1 and 2. The drive mechanism is supported on a shaft 34 parallel to the shaft 13 and rotatably carrying a pair of Geneva wheels 35 and 36, which are rotatable on the shaft and are drive-connected, respectively, to pinions 37 and 38. The Geneva wheel 35 engages the periphery of the disc 21 and is held against rotation thereby. Upon each revolution of the sleeve 13 the pin 19 on arm 18 will engage one of the slots in the Geneva wheel and will turn it through a fraction of a revolution, turning of the wheel being permitted by the gap 22 in the disc 21. When the wheel turns through the predetermined partial revolution one-quarter of a revolution, as shown, it will turn the pinion 37, which meshes with the gear 24 to turn the sleeve 23 and disc 15 through one-tenth of a revolution. In a similar manner, the Geneva wheel 36 and pinion 38 will turn the sleeve 29 and disc 16 through one-tenth of a revolution for each full revolution of the sleeve 23 and disc 15.

The positions of the discs are indicated by the indicating devices shown as electric switches 39, 41 and 42. The indicating devices are carried by arms 43 mounted on a shaft 44 supported in the end plates 10 and 11, parallel to, and spaced from, the shaft 13. The indicating devices are adapted to be oscillated between a rest position, as shown in Figure 2, and a limit position, as indicated by the dot-dash line at the lower part of Figure 2. It will be noted that in the rest position the indicating devices lie beyond the peripheries of the discs, and in the limit position they lie within the peripheries of the disc adjacent to the edge thereof.

As the shaft 44 is oscillated the indicating devices are adapted to sweep across the faces of the respective discs in different paths, depending upon the angular positions of the discs. During such movement the indicating devices are adapted to be operated as by temporarily closing the switches to produce pulses corresponding to the positions of the discs. For this purpose, each disc is provided on the face thereof traversed by an indicating device with a plurality of actuating elements 45 which, as shown, are in the form of cam projections extending beyond the face of the disc to engage and close the switches as they move across the discs. The cam projections 45 may be spaced as illustrated diagrammatically in Figure 5, and the paths of movement may be so regulated that impulses varying from 0 to 9 will be produced as the indicating device traverses the different paths across the disc face. For example, in the arcuate path designated "0" in Figure 5, it will be seen that the indicating devices will not engage any cam projections so that no impulses will be produced. In the arcuate path designated "1," the indicating device will be operated when it is in its limit position, so that in a complete oscillation only one impulse will be produced. In the arcuate path designated "2," the indicating device will engage a single cam projection in its travel in one direction and will engage the same cam projection again in its return travel, to produce two separate impulses. Similarly, in traversing the different paths, the indicating device will engage different numbers of cam projections to produce numbers of impulses corresponding to the position of the disc.

In order to oscillate the shaft 44 and arms 43, the shaft is provided with a crank arm 46 connected through a connecting rod 47 with a crank pin 48 carried by a rotatable shaft 40. The shaft 49 may be turned through a single revolution by any desired type of driving means each time it is desired to obtain a digital indication of the value corresponding to the position of the discs. Rotation of the shaft 49 will cause each of the arms 43 to swing from its rest to its limit position and back to its rest position, to produce a complete indication of the value represented by the position of the shaft 13.

In order to insure accurate positioning of the discs and to hold them against movement during an indicating operation, the star wheel 32 is adapted to be engaged by a keeper 51. As best seen in Figure 3, the keeper 51 is in the form of a roller carried by a lever 52 pivoted at 53 on the end plate 10. A spring 54 normally urges the keeper away from the star wheel and the keeper is moved into engagement with the star wheel by a cam 55 secured to the shaft 44 to turn therewith. The cam 55 is circular through most of its cam surface and has a depression at one end corresponding to the rest position of the shaft. A follower 56 on the lever 52 normally engaged the recessed portion of the cam surface to allow the spring 54 to move the keeper 51 away from the star wheel 32, so that the shaft 13 can be turned freely. As soon as the shaft 44 starts to turn the cam 55 will move the keeper into engagement with the star wheel to latch the shaft 13 against turning. In addition, if the angular position of the shaft 13 should be such that the indicating device 39 might not traverse accurately one of the desired paths, the keeper acting on the star wheel will turn the shaft 13 and disc 14 through a slight angle to cause proper registration of the indicating device 13 with the cam projections in the desired path on the face of the disc. Thus, accurate digital conversion is insured, regardless of the accuracy of positioning of the input shaft 13. When the shaft 13 is given a step-by-step movement by the sensing mechanism corresponding accurately to digital positions, the star wheel and keeper might be omitted.

The receiving mechanism which receives and indicates or records the electrical impulses is, of necessity, an electrical device, and it is preferred that it be energized only during a recording operation, in order to minimize loss of electrical energy. For this purpose, the shaft 49 may carry a cam 57, which may be in the form of two adjustably-connected discs, as illustrated in Figure 3. The cam 57 engages a follower 58 carried by a switch-actuating lever 59 for operating a switch 61, which may be connected in the energizing circuit of the receiving device. In the rest position of the parts, as shown in Figure 3, the follower 58 rests in a recess or depression in cam 57, so that the switch 61 is open. Upon initial turning of the shaft 49 to start a recording operation, the cam 57 will move the follower 58 upward to close the switch 61 and energize the receiving device, so that it is in a condition to receive pulses transmitted thereto by the switches 39, 41 and 42. The switch 61 is also preferably included in a holding circuit for a motor driving the shaft 49 to insure one complete revolution of the shaft and one complete cycle of the apparatus each time the motor is energized.

While one embodiment of the invention has been shown and described in detail, it will be understood that this is illustrative only and is not to be taken as a definition of the scope of the invention, reference being had for this purpose to the appended claims.

What is claimed is:

1. In a digital converter, a disc, a sensing device, means to move the sensing device forward and backward across the face of the disc in a predetermined track of fixed arcuate length, means to turn the disc relative to the moving means so that the sensing device will traverse different paths of equal length across the face of the disc corresponding to different values, and a plurality of actuating elements on the face of the disc spaced so that different numbers of elements will be engaged by the sensing device as it traverses said different paths across the face of the disc.

2. The digital converter of claim 1 in which the sensing device is an electric switch and the actuating elements are cam elements to engage and operate the switch different numbers of times as it moves in said different paths.

3. In a digital converter, a flat disc, means mounting the disc for rotation about a central axis to different angular positions corresponding to different values to be indicated, an arm mounted for oscillation about an axis outside of the disc and parallel to the disc axis, means to oscillate said arm through a fixed angle, a sensing device carried by the free end of the arm to move in different arcuate paths of equal length across the face of the disc in different angular positions of the disc, and a plurality of actuating elements on the face of the disc spaced so that different numbers of elements will be engaged by the sensing device as it traverses said different paths.

4. In a digital converter, a flat disc, means mounting the disc for rotation about a central axis to different angular positions corresponding to different values to be indicated, an arm mounted for oscillation about an axis outside of the disc and parallel to the disc axis, means to oscillate said arm through a fixed angle, a sensing device carried by the free end of the arm to move in different arcuate paths of equal length across the face of the disc in different angular positions of the disc, means to oscillate the arm to move the sensing device from a rest position beyond the periphery of the disc to a limit position within the periphery of the disc, and a plurality of actuating elements on the face of the disc spaced so that different numbers of elements will be engaged by the sensing device as it traverses said different paths to actuate the sensing device different numbers of times, certain of the actuating elements being positioned to be engaged by the sensing device in its limit position to provide an odd number of actuations thereof.

5. In a digital converter, a flat disc, means mounting the disc for rotation about a central axis to different angular positions corresponding to different values to be indicated, an arm mounted for oscillation about an axis outside of the disc and parallel to the disc axis, means to oscillate said arm through a fixed angle, a sensing device carried by the free end of the arm to move in different arcuate paths of equal length across the face of the disc in different angular positions of the disc, locking means for the disc to hold the disc against rotation during movement of the arm including a cam connected to the arm to move therewith, and a plurality of actuating elements on the face of the disc spaced so that different numbers of elements will be engaged by the sensing device as it traverses said different paths.

6. The digital converter of claim 5 in which the locking means comprises a star wheel secured to the disc and a keeper element moved into engagement with the star wheel by the cam.

7. The digital converter of claim 3 in which the sensing device is an electric switch and the actuating elements are cam projections on the disc to engage and actuate the switch to produce a number of electric pulses equal to the number of cam projections engaged by the switch as the arm swings in an oscillation.

8. A digital converter, comprising a series of flat discs mounted for rotation about a common axis, means to turn the first disc through an angle representative of the number of units in a value to be indicated, means operated by each of the discs in the series upon each complete revolution thereof to turn the succeeding disc through one tenth of a revolution, a shaft mounted parallel to and displaced from the axis of the discs, a series of arms on the shaft extending over the faces of the discs respectively, a sensing device on the free end of each arm to traverse the face of one of the discs in different arcuate paths determined by the angular position of the discs, means to oscillate the shaft through a fixed angle to cause the sensing devices to traverse the discs simultaneously, and a plurality of actuating elements on the face of each of the discs spaced so that different numbers of elements will be engaged by the sensing devices as they traverse the different paths.

9. The digital converter of claim 8 in which the sensing devices are electric switches and the actuating elements are cam projections to engage and operate the switches to produce electric pulses.

10. The digital converter of claim 8 including a star wheel connected to the first disc, a keeper engageable with the star wheel, and a cam on the shaft to move the keeper into engagement with the star wheel when the shaft is oscillated.

References Cited in the file of this patent
UNITED STATES PATENTS

| | | |
|---|---|---|
| 2,668,013 | Dawson | Feb. 2, 1954 |
| 2,749,538 | Cooper et al. | June 5, 1956 |
| 2,813,677 | Scarbrough | Nov. 19, 1957 |
| 2,814,442 | Daykin | Nov. 26, 1957 |